United States Patent

[11] 3,593,066

| [72] | Inventor | Rayford M. Norman, Sr.<br>2117 Windover Drive, N.E., Huntsville, Ala. 35811 |
|---|---|---|
| [21] | Appl. No. | 857,024 |
| [22] | Filed | Sept. 11, 1969 |
| [45] | Patented | July 13, 1971 |

[54] ASSEMBLY HAVING A PLURALITY OF CAPACITORS
5 Claims, 9 Drawing Figs.

[52] U.S. Cl. .................................................. 317/230, 317/242
[51] Int. Cl. .................................................. H01g 1/02
[50] Field of Search ........................................ 317/230, 231, 233, 260

[56] References Cited
UNITED STATES PATENTS

| 2,488,763 | 11/1949 | Charlin | 317/230 |
| 3,897,418 | 7/1959 | Call | 317/230 |
| 3,020,453 | 2/1962 | Hogue | 317/230 |
| 3,159,776 | 12/1964 | Metcalf | 317/230 |
| 3,346,783 | 10/1967 | Millard | 317/230 |

*Primary Examiner*—James D. Kallam
*Attorney*—C. A. Phillips

ABSTRACT: An electrical capacitor assembly consisting of a base assembly having a plurality of like spaced pairs of electrical receptacles and a plurality of elongated electrolytic capacitor elements each having a pair of pronged terminals being adapted to be plugged into a pair of the receptacles. One receptacle of each pair of terminals is connected to a common external conductor and each of the remaining receptacles is connected to individual external conductors, whereby a composite capacitor assembly is made up of a desired selected combination of capacitor elements.

PATENTED JUL 13 1971

3,593,066

Rayford M. Norman Sr.
INVENTOR

E. A. Phillips
ATTORNEY

ASSEMBLY HAVING A PLURALITY OF CAPACITORS

This invention relates to electrical capacitors and particularly to multiunit or element capacitor construction and still more particularly to electrolytic capacitor construction wherein multiple element capacitors can be readily fabricated by joining together prefabricated single capacitor elements.

Electrical and electronic devices typically employ many electrical capacitors and of these many are the multiple element electrolytic type, wherein several, typically two to four, capacitor units are combined in a single housing and wherein one terminal of each, the negative terminal, is connected to a common or ground terminal, e.g., a metal housing, a supporting tab or other accessible terminal or lead.

As an illustration, one capacitor unit might be 350 mfd. at a working voltage of 450 volts, another might be 250 mfd. at 500 volts, another of 50 mfd. at at 100 volts and another at 20 mfd. at 50 volts. There are literally thousands, possibly tens of thousands, of such combinations of capacitor values and voltages required in existing electrical and electronic circuitry and for which it is now necessary to manufacture individual multicapacitor and voltage units to meet these requirements both for original equipment and for replacement purposes. This, of course, also requires that distributors, dealers and repair service shops stock or attempt to stock many, many capacitors for which actual requirements are uncertain in order to be equipped to handle potential customer demands. As a result, tremendous inventories are maintained by manufacturers and the larger distributors in order to provide complete selections even though calls for many types may be infrequent. This is, of course, an uneconomical situation and one which increases capacitor costs in general. Smaller distributors simply cannot afford to maintain complete stocks and are thus put to a disadvantage as unable to effectively compete Further, since the majority of distributors fall in the latter class, it means that their customers are often unable to obtain a needed capacitor.

Another aspect of the situation is that in most instances when there is a failure of a multiunit capacitor only one of the units actually fails and thus it becomes necessary to discard several working capacitor elements in order to replace the single bad one.

While there have been disclosures in prior art of selectable combination capacitor assemblies, the applicant is unaware of the existence of any actual capacitor assemblies or literature illustrative of same which meet the existing need for a multielement capacitor assembly of components which can be economically manufactured, where selected capacitor units may be readily combined with other selected capacitor units and the composite assembly be both structurally durable and electrically reliable.

It is, accordingly, an object of this invention to provide a new and improved multielement capacitor.

It is a further object of this invention to provide a multicapacitor assembly wherein any desired combination of several capacity values and working voltages may be duplicated in a single mounted structure conveniently and economically with a relatively small stock of base units and single unit capacitor elements.

In accordance with the invention individual capacitor elements, typically consisting of two sheets of thin metal foil separated by a thin sheet or layer of dielectric material are wound in a conventional manner to form elongated circular capacitor units with values of capacitance and voltage ratings dependent upon the total area of the metal foil, the characteristics of the dielectric material, voltage breakdown of the dielectric material and thickness of the dielectric material. A terminal base is attached to one end of each capacitor element and two conductive prongs extend outwardly from and are supported by the base. One of the prongs is electrically connected to one sheet of foil of the capacitor and the other prong is connected to the other sheet of foil of the capacitor. Assuming a polarized capacitor, the negative terminal prong would be positioned adjacent the periphery of the structure and positive terminal prong positioned a predetermined distance from it. The individual capacitor elements are combined by means of a mounting base which consists basically of an insulated supporting base member which incorporates two to four sets of receptacles for receiving, supporting and providing output connections from the individual capacitor elements. An outer conductive flange extends around or near the periphery of the base and it contains receptacles adapted to receive the negative terminal prong of each capacitor element, the negative terminal of each capacitor being maintained at a common potential in multiunit electrolytic capacitors to which the present invention has its principal application. Spaced interior of the flange receptacles are positive prong receptacles for each capacitor and they are spaced in accordance with the prong spacing of the individual capacitor elements, thus terminal pairs consist of one flange or outer receptacle and one inner receptacle.

These and other objects, features and advantages of this invention will become more apparent from the following description when considered together with the drawings in which.

Figure 1:
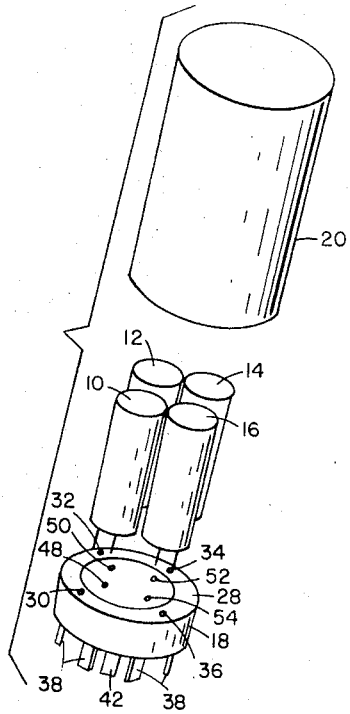
FIG. 1 is an exploded perspective view of a capacitor assembly constructed in accordance with the invention.
Figure 2:
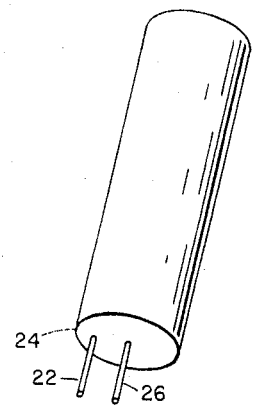
FIG. 2 is a perspective view of one of the capacitor elements shown in FIG. 1.
Figure 3:
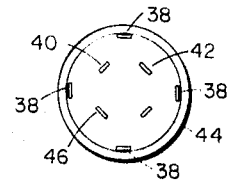
FIG. 3 is a bottom view of the base member shown in FIG. 1.
Figure 4:
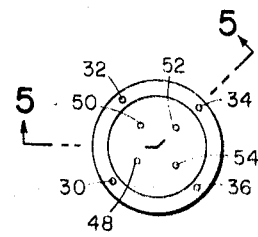
FIG. 4 is a top view of the base member shown in FIG. 1.
Figure 5:
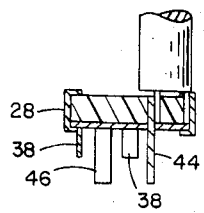
FIG. 5 is a sectional view along the lines 5-5 of FIG. 4.
Figure 6:
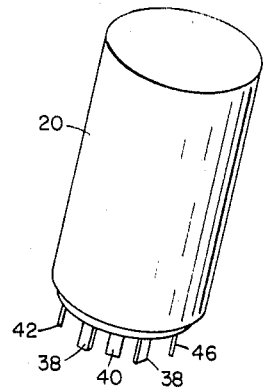
FIG. 6 is a perspective view of an assembled capacitor of the type shown in FIG. 1.

Referring now to the drawings, particularly to FIGS. 1—6, individual capacitor units 10, 12, 14 and 16 of various capacities and voltage ratings are illustrated together with chassis mounting base 18 and cover 20. Capacitor 10 is shown in FIG. 2 and it is a cylindrical elongated capacitor element with negative terminal prong 22 positioned adjacent to edge 24 of capacitor 10. Positive terminal 26 is positioned a predetermined distance from prong 22 and this distance is constant although the diameters and lengths of capacitor elements may vary with different capacitance values and voltage ratings. In fact both diameter and length of a capacitor element may be conveniently varied to this end and yet is compatible with the overall construction of composite capacitors made in accordance with the invention. Cover 20 while providing a small amount of lateral support for individual capacitor elements is not essential for maintaining the individual capacitor element in position, which are held by prongs 22 and 26 which are of a size and rigidity to independently hold a capacitor in position in mounting base 18.

Flange 28 of mounting base 18 forms a peripheral cover and serves to provide a common negative terminal bus for the negative side of each of the capacitors and includes receptacles 30, 32, 34 and 36 for receiving the negative polarity prong of each of capacitors 10, 12, 14 and 16. Flange 28 also incorporates bendable tabs 38 which secure the capacitor structure to the chassis of the electrical circuit to which the capacitor elements are to be connected. Thus, the negative terminal of the capacitors are connected through flange 28 to the chassis which would be the negative or grounded reference for circuitry of the chassis. Terminals 40, 42, 44 and 46 extend outward of mounting base 18 and provide the positive terminals for each of capacitor elements 10, 12, 14 and 16, being internally connected in base 18 with each receptacles 48, 50, 52 and 54. In this application of the invention, circuit leads to which the capacitors are to be connected are soldered to terminals 40, 42, 44 and 46 either at the time of original construction of the circuit on the chassis where units constructed with the invention were originally used or at the time of replacement of a conventional capacitor with one constructed in accordance with the invention herein disclosed. Once a mounting base 18, as illustrated, is incorporated into a circuit, thereafter the failure of a single capacitor element requires only the replacement of that element and not the whole capacitor assembly as heretofore.

Figure 7:
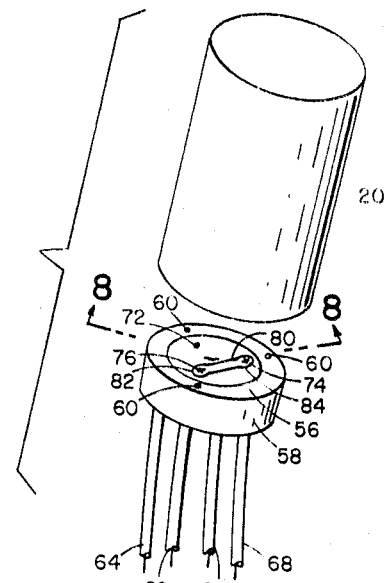
FIG. 7 is an exploded perspective view, without capacitor elements, of an embodiment of the invention in which terminals are in the form of terminal leads.
Figure 8:
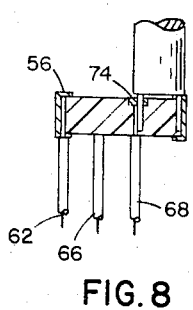
FIG. 8 is a sectional view along the lines 8-8 of FIG. 7.

FIG. 7 illustrates a variation of the invention in which flange 28 as such, is omitted and instead a common receptacle plate 56 is positioned on the top side of mounting base 58 and includes negative prong receptacles 60. Common receptacle plate 56 is connected by an insulated wire lead 62 to the common chassis or ground or other common negative terminal bus of the circuit to which the capacitor is to be connected. Insulated wire leads 64, 66, and 68 interconnect to each of inner receptacles 72, 74 and 76 and provide means for interconnection of the positive terminals of the individual capacitor units, e.g., 10, 12, 14, etc., to the respective circuit points to which the capacitors are to be connected in a circuit.

Figure 9:
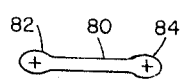
FIG. 9 is a shorting element adapted to be used in electrically interconnecting individual capacitors elements.

Mounting of capacitor assembly of the wire terminal type is by means of a clamp, not shown, or the capacitor may be permitted to remain free except for the interconnection of the wire connections which would serve to both electrically and mechanically support it. While FIG. 7 shows a three-capacitor type construction for wired terminal application, it is to be understood that a different number may be employed. The composite construction shown in FIGS. 1 and 7 represent the two basic forms of electrolytic capacitor construction and would serve to be compatible with most applications for electrolytic capacitor replacement. In order to give further flexibility to the system, parallel connection of capacitors to double capacity for a particular circuit may be readily achieved by a shorting bar 80 shown in FIGS. 7 and 9 and which would fit between a pair of positive receptacles and the positive terminal prongs of capacitors to be joined would pass through receptacles 82 and 84 of shorting bar 80 and plugged into a base 18 or 58. This arrangement is illustrated in FIG. 7.

Additionally, where desired, special base interconnections may be used wherein a common connection between all negative prongs is omitted and terminals are brought out separately for each negative receptacle, permitting the use of a shorting bar 80 to achieve series interconnections of capacitors to achieve increased voltage ratings, with reduced capacitance. Series interconnection, which also achieves depolarization, is accomplished by connecting two negative terminals together, either by a common negative base or by shorting bar 80 and then the positive terminals are connected to the circuit, and the common negative interconnection is left floating.

In summary, it is believed that capacitors assembled and constructed in accordance with the foregoing disclosure and description provide an improved manner of constructing and assembling electrolytic capacitors and will permit the duplication of thousands or tens of thousands of inventoried multielement capacitors by relatively few single capacitor elements together with mounting bases as illustrated. It will permit manufacturers to substantially reduce types of units they must manufacture and permit them and their distributors to substantially reduce inventories. Further it will make possible for the first time an essentially full range of replacement capacitors to be stocked by small distributors who serve a large percentage of radio and television service shops. The result will be that cost can be reduced to everyone by the added efficiency permitted in reduced numbers of capacitors to be manufactured, stocked and sold.

I claim:
1. A capacitor assembly comprising:
   A. a plurality of capacitor units wherein each one comprises:
      1. a circularly wound capacitor element,
      2. a circular insulating case surrounding said capacitor element and covering one end of said capacitor element,
      3. a base attached to and enclosing the other said end of said capacitor element, and
      4. a pair of electrically conductive elongated prongs supported by and extending outwardly from said base for providing electrical terminals from and supporting said capacitor element, one of said prongs being a predetermined distance from a near edge of said case and the other prong being a predetermined distance from said one prong; and
   B. a mounting base assembly comprising:
      1. a base portion of insulating material,
      2. a plurality of spaced outer electrical receptacles, each said outer receptacle being adapted to receive a said prong of a said capacitor element which is a said predetermined distance from the edge of a said capacitor element,
      3. a like plurality of inner electrical receptacles, being interior of said outer receptacles, and being spaced wherein discrete pairs of receptacles consist of one outer receptacle and one inner receptacle uniquely spaced to receive the prongs of and thereby support a said capacitor element, and
      4. a separate externally extending conductor attached to each of said inner receptacles and terminal means including an external connective terminal for electrically terminating each of said outer receptacles to said external connective terminal.

2. A capacitor assembly as set forth in claim 1 wherein said terminal means comprises a conductive plate interconnecting each of said outer receptacles.

3. A capacitor assembly as set forth in claim 2 wherein said terminal means includes a plurality of bendable members for supporting said mounting base assembly on and electrically connecting said plate to a conductive chassis on which said assembly is to be used.

4. A capacitor assembly as set forth in claim 1 wherein said externally extending conductors connected to each of said inner receptacles comprises a flexible electrical wire.

5. A capacitor assembly as set forth in claim 2 wherein each said externally extending conductor connected to each of said inner receptacles comprises a connective terminal.